_United States Patent Office_ 3,090,813
Patented May 21, 1963

3,090,813
PROCESS FOR PREPARING ARYLINDANDIONES
Karl Geiger, Dobbs Ferry, Seymour L. Shapiro, Hastings on Hudson, and Louis Freedman, Bronxville, N.Y., assignors to U.S. Vitamin & Pharmaceutical Corporation, a corporation of Delaware
No Drawing. Filed June 27, 1960, Ser. No. 38,717
6 Claims. (Cl. 260—590)

This invention is concerned with a novel, efficient process for the synthesis of 2-arylindandiones.

Such indandiones include, in particular, compounds of the following formula

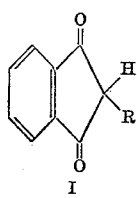

I wherein R is phenyl, substituted phenyl, and naphthyl.

In recent years, a variety of useful compounds with utility as rodenticides and as anticoagulants has been discovered which are described by the formula above, and it is an object of this invention to prepare such 2-arylindandione anticoagulants in an economical manner, in pure form and in high yield. In particular, the economies of this new process are significant wherein the aromatic aldehyde, such as p-bromobenzaldehyde is difficultly accessible and expensive.

In general, synthetic procedures utilized for such compounds described above have been only moderately successful, and yields have rarely exceeded 50 percent. A proven procedure involves the alkoxide catalyzed condensation of phthalide with the appropriate arylaldehyde (see Dieckmann, Ber., 47, 1439 (1914)) according to the following equation using equivalent quantities of each of the reactants, including the alkoxide.

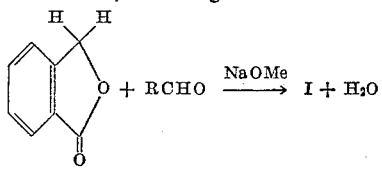

As will be noted, in addition to the desired arylindandione, another product of the reaction is water. In the course of our investigations we have established that the formed water is critical to the noted poor yields obtained in this process. It is thus a principal objective of this invention to obtain reaction conditions which permit the formation of the arylindandiones in theoretical quantity, and particularly with this end in view, to establish a means which removes the formed water.

Employment of a variety of dehydrating agents customarily used in the art, including calcium oxide, magnesium sulfate, or azeotropic distillation with benzene, has failed to effect the necessary selective removal of water and has equally failed to give desirable yields of the required arylindandiones.

We have now found that a member of the group consisting of the ester II.

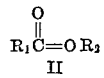

II where $R_1$ is hydrogen or $C_1$–$C_3$ alkyl and $R_2$ is a $C_1$–$C_4$ alkyl, and desirably wherein the ester II is ethyl propionate, is selectively saponified by the formed water (with utilization of an additional mole of alkoxide catalyst) of the reaction to yield the sodium salt $R_1COONa$ and the alcohol $R_2OH$ (when the catalyst is sodium alkoxide and suitably sodium methoxide). In turn, the formation of the required indandione proceeds to theoretical yield.

Additional effective catalysts are obtained from the group consisting of the alkali metal alkoxide such as lithium ethoxide, potassium methoxide, potassium t-butoxide and the like. For the purpose of our invention the commercially accessible sodium methoxide is preferred, although the alkali metal alkoxide employed is not critical. The theoretical quantity of alkoxide catalyst required is two equivalents, one for the sodium salt of the indandione, the other for removal of water; however, more than two equivalents may be employed.

The quantity of ester II incorporated in the reaction charge requires that at least one molar equivalent be employed, although larger quantities such as two to three molar equivalents are preferred. Alternatively, even larger quantities, while sevriceable, are not consistent with economy or manipulative simplicity.

The quantity of ester may vary in a one mole run in a typical example from 1 mole to 1000 ml. without critical effect on the process. The ester may be varied as described above for $R_1COOR_2$ as methyl propionate, ethyl butyrate and the like, and retain the inventive feature of the process. The esters used are desirably dried, although they may be rendered water-free by azeotropic distillation from the reaction mixture (before the alkoxide is added).

The novel process of this invention will be more fully understood upon consideration of the following specific working examples.

EXAMPLE 1

α-Naphthylindandione.—To a mixture of 146 g. (1 mole) of α-naphthaldehyde, 134 g. (1 mole) of phthalide and 480 ml. of dried ethyl propionate, there was rapidly added 3 moles of sodium methoxide in 700 ml. of methanol. The reaction mixture was maintained at 65° C. with stirring for two hours thereafter. When cool, the volatiles were removed, the residue dissolved in 5.5 liters of water, the whole washed with ether and filtered. Upon acidification to pH 2.0 the aqueous phase afforded the substantially pure product, 262 g. (96.5%), M.P. 207–211° C.

On recrystallization (9 parts methyl ethyl ketone), there was obtained 217 g. (83%), M.P. 217–218° C.

EXAMPLE 2

Employing a similar procedure to that described above and using the aldehyde RCHO, the following yields of arylindandiones (I) were obtained and are herein tabulated.

In this work a number of parameters defining the synthetic system may be varied, and these include the variation in the aromatic aldehyde, the ester, the quantity of ester, the quantity of alkoxide, the duration of the reaction, and the temperature at which reaction is conducted. These conditions have all been investigated and are described in the tables below.

Table I
VARIATION of the AROMATIC ALDEHYDE

Constants:
  Ester—Ethyl propionate (3 equivalents)
  Alkoxide—Sodium methoxide (3 equivalents)
  Time—2 hours
  Temperature—65° C.

| Aldehyde | Percent yield of Indandione I | M.P. | M.P., Pure | Δ M.P.[a] |
|---|---|---|---|---|
| Benzaldehyde | 100 | 135–142 | 148–149 | 10 |
| p-Tolualdehyde | 92 | 135–138 | 144–148 | 9.5 |
| p-Fluorobenzaldehyde | 100 | 114–117 | 116–117 | 1 |
| p-Chlorobenzaldehyde | 99 | 136–138 | 142–145 | 6.5 |
| p-Bromobenzaldehyde | 100 | 126–134 | 144–145 | 14.5 |
| p-Iodobenzaldehyde | 89 | 135–136 | 143–144 | 8 |
| Anisaldehyde | 100 | 148–154 | 152–154 | 2 |
| α-Naphthaldehyde | 97 | 207–211 | 217–218 | 8.5 |

[a] ΔM.P. is calculated by subtracting the center of the range of the pure melting point from the crude melting point.

Table II
VARIATION of the ESTER

Constants:
  Aldehyde—Benzaldehyde[b]
  Alkoxide—Sodium methoxide (3 equivalents)
  Time—2 hours
  Temperature—65° C.

| Ester | Percent yield of Indandione I | M.P. | M.P., Pure | ΔM.P.[a] |
|---|---|---|---|---|
| Methyl formate[c] | 93.4 | 137–145 | 148–149 | 7.5 |
| Ethyl acetate | 87.5 | 116–140 | 148–149 | 20.5 |
| Isopropyl acetate | 91 | 139–144 | 148 149 | 7 |
| Butyl acetate | 82 | 140–147 | 148–149 | 5 |
| Glycol diformate | 83 | 135–143 | 148–149 | 9.5 |
| Methyl propionate | 100 | 144–149 | 148–149 | 2 |
| Ethyl propionate | 100 | 135–142 | 148–149 | 10 |
| Isopropyl propionate | 100 | 124–137 | 148–149 | 18 |
| Ethyl butyrate | 98 | 144–146 | 148–149 | 3.5 |
| Methyl isobutyrate | 96 | 137–144 | 148–149 | 8 |
| Ethyl acetate[b1] | 100 | 125–132 | 142–145 | 15 |
| Methyl formate[b2,c] | 96 | 147–150 | 152–154 | 4.5 |
| Ethyl butyrate[b3] | 95 | 208–211 | 217–218 | 8 |

[a] ΔM.P. is calculated by subtracting the center of the range of the pure melting point from the crude melting point.
[b] Aldehyde varied where shown; [b1] p-chlorobenzaldehyde; [b2] p-anisaldehyde; [b3] α-naphthaldehyde.
[c] Reaction temperature 34° C.

Table III
VARIATION of TIME and TEMPERATURE

Constants:
  Aldehyde—Benzaldehyde
  Ester—Ethyl propionate (3 equivalents)
  Alkoxide—Sodium methoxide (3 equivalents)

| Time (Hours) | Temperature °/C. | Percent yield of Indandione I | M.P. | M.P., Pure | ΔM.P.[a] |
|---|---|---|---|---|---|
| 1 | 20 | 68 | 130–142 | 148–149 | 12.5 |
| 4 | 20 | 91 | 132–142 | 148–149 | 11.5 |
| 20 | 20 | 100 | 142–149 | 148–149 | 3 |
| 0.25 | 65 | 82 | 140–147 | 148–149 | 5 |
| 0.5 | 65 | 89 | 142–148 | 148–049 | 3.5 |
| 1 | 65 | 100 | 144–149 | 148–149 | 2 |
| 2 | 65 | 100 | 135–142 | 148–149 | 10 |
| 2[b] | 65 | >10 | 75–105 |  |  |
| 2[c] | 65 | 85 | 139–145 | 148–149 | 6.5 |
| 2[d] | 65 | none |  |  |  |

[a] ΔM.P. is calculated by subtracting the center of the range of the pure melting point from the crude melting point.
[b] One equivalent of ethyl propionate and one equivalent of sodium methoxide was used.
[c] Two equivalents of ethyl propionate and two equivalents of sodium methoxide were used.
[d] An additional three equivalents of water were added to reaction mixture.

If, instead of the ester, the following reagents were substituted in the reaction mixture in the attempt to remove the formed water—calcium oxide, magnesium sulfate, or benzene—the product, R=phenyl, was not isolable and at best could have only been formed in poor yield.

As is noted from the melting point of the products as initially isolated, these compounds are substantially pure. The final step of purification employs recrystallization solvents such as isopropyl alcohol, methyl ethyl ketone, methanol and the like, and the products are obtained in a state of analytical purity in over 80% yield. Other solvent systems, as is well known to those skilled in the art, may be employed to obtain even better yields of recrystallized product.

It is to be understood that it is intended to cover all changes and modifications of the examples herein chosen for the purposes of illustration which do not constitute departures from the spirit and scope of the invention.

We claim:

1. In the process of preparing a 2-arlyindandione of the formula

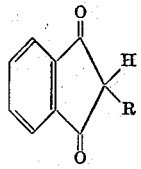

by the alkali metal alkoxide catalyzed reaction of the aldehyde, RCHO, and phthalide, the step of including in the reaction mixture an additional equivalent of alkali metal alkoxide, and at least one equivalent of ester, $R_1COOR_2$, wherein R is selected from the group consisting of α-naphthyl, phenyl and substituted phenyl, said substituents on the phenyl being selected from the group consisting of halo, alkyl and alkoxy $R_1$ is selected from the group consisting of hydrogen and $C_1$–$C_3$ alkyl, and $R_2$ is selected from the group consisting of $C_1$–$C_4$ alkyl.

2. The process of claim 1 wherein R is p-bromophenyl and the ester, $R_1COOR_2$ is ethyl propionate.

3. The process of claim 1 wherein R is p-chlorophenyl and the ester, $R_1COOR_2$ is ethyl propionate.

4. The process of claim 1 wherein R is phenyl and the ester, $R_1COOR_2$ is ethyl propionate.

5. The process of claim 1 wherein R is α-naphthyl and the ester, $R_1COOR_2$ is ethyl propionate.

6. The process of claim 1 wherein R is p-methoxyphenyl and the ester, $R_1COOR_2$ is ethyl propionate.

References Cited in the file of this patent
UNITED STATES PATENTS

| | | |
|---|---|---|
| 2,820,738 | Litvan et al. | Jan. 21, 1958 |
| 2,938,925 | Molho | May 31, 1960 |